United States Patent
Jenkins et al.

(10) Patent No.: US 7,530,528 B2
(45) Date of Patent: May 12, 2009

(54) METHODS AND APPARATUS FOR GUIDANCE SYSTEMS

(75) Inventors: David G. Jenkins, Tucson, AZ (US); Byron B. Taylor, Tucson, AZ (US)

(73) Assignee: Raytheon Company, Waltham, MA (US)

( * ) Notice: Subject to any disclaimer, the term of this patent is extended or adjusted under 35 U.S.C. 154(b) by 0 days.

(21) Appl. No.: 11/549,592

(22) Filed: Oct. 13, 2006

(65) Prior Publication Data

US 2007/0290096 A1 Dec. 20, 2007

Related U.S. Application Data

(63) Continuation-in-part of application No. 11/548,968, filed on Oct. 12, 2006.

(60) Provisional application No. 60/727,181, filed on Oct. 13, 2005.

(51) Int. Cl.
   *F42B 15/01* (2006.01)
   *F41G 7/00* (2006.01)
   *F42B 15/00* (2006.01)

(52) U.S. Cl. .................. 244/3.16; 244/3.1; 244/3.15

(58) Field of Classification Search ........... 244/3.1–3.3; 102/473–529
See application file for complete search history.

(56) References Cited

U.S. PATENT DOCUMENTS

| | | | | | |
|---|---|---|---|---|---|
| 2,457,393 | A | * | 12/1948 | Muffly | 244/3.16 |
| 2,986,637 | A | * | 5/1961 | Null | 244/3.16 |
| 2,995,318 | A | * | 8/1961 | Cocharo | 244/3.16 |
| 2,997,594 | A | * | 8/1961 | MacNeille | 244/3.16 |
| 3,145,949 | A | * | 8/1964 | Smith, Jr. | 244/3.16 |
| 3,398,918 | A | * | 8/1968 | Girault | 244/3.13 |
| 4,678,142 | A | | 7/1987 | Hirschfield | |
| 5,259,568 | A | | 11/1993 | Amon et al. | |

* cited by examiner

*Primary Examiner*—Bernarr E Gregory
(74) *Attorney, Agent, or Firm*—The Noblitt Group, PLLC

(57) ABSTRACT

Methods and apparatus for guidance systems according to various aspects of the present invention operate in conjunction with a projectile including a guidance system having a guidance controller, a detector, and an optical system. The guidance controller controls the path of the projectile according to signals from the detector. The detector generates signals according to an angle of incident energy. The optical system transfers the energy to the detector via a spreader and a condenser. The spreader spreads the incident energy, and the condenser converges the spread energy onto the detector.

30 Claims, 10 Drawing Sheets

US 7,530,528 B2

METHODS AND APPARATUS FOR GUIDANCE SYSTEMS

CROSS-REFERENCES TO RELATED APPLICATIONS

This application claims the benefit of U.S. Provisional Patent Application No. 60/727,181, filed 13 Oct. 2005, is a continuation-in-part of U.S. Nonprovisional patent application Ser. No. 11/548,968, filed 12 Oct. 2006, and incorporates the disclosure of each application by reference.

BACKGROUND OF THE INVENTION

Atmospherically induced scintillation may cause substantial aberrations in perceived energy received from a distance. In various military applications, missiles and other guided ordnance may be configured to track and engage targets via remote laser designation. Atmospherically induced scintillation effects, however, may produce guidance errors, causing the ordnance to miss the intended target. Scintillation is the variation of energy across a seeker aperture. Scintillation causes non-uniform irradiance to enter the sensor, which distorts the transfer function.

The performance degradation is pronounced in fixed sensors, i.e., seekers that are not gimbaled. Corrective beam pointing has been conventionally observed with gimbaled configurations. In these systems, a lens or other optical element may be mounted to a gimbal which is generally free to rotate on at least one axis. Accordingly, the optical configuration may be directed to a desired angle to correct guidance errors as necessary. Unfortunately, the gimbal and supporting actuators substantially add to the cost, complexity and failure susceptibility of the system.

SUMMARY OF THE INVENTION

Methods and apparatus for guidance systems according to various aspects of the present invention operate in conjunction with a projectile including a guidance system having a guidance controller, a detector, and an optical system. The guidance controller controls the path of the projectile according to signals from the detector. The detector generates signals according to an angle of incident energy. The optical system transfers the energy to the detector via a spreader and a condenser. The spreader spreads the incident energy, and the condenser converges the spread energy onto the detector.

BRIEF DESCRIPTION OF THE DRAWINGS

A more complete understanding of the present invention may be derived by referring to the detailed description and claims when considered in connection with the following illustrative figures. In the following figures, like reference numbers refer to similar elements and steps throughout the figures.

Elements and steps in the figures are illustrated for simplicity and clarity and have not necessarily been rendered according to any particular sequence. For example, steps that may be performed concurrently or in different order are illustrated in the figures to help to improve understanding of embodiments of the present invention.

DETAILED DESCRIPTION OF EXEMPLARY EMBODIMENTS

The present invention may be described in terms of functional block components and various processing steps. Such functional blocks may be realized by any number of hardware or software components configured to perform the specified functions and achieve the various results. For example, the present invention may employ various sensors, optical elements, and components, e.g., lenses, detectors, energy concentrators, guidance controllers, and the like, which may carry out a variety of operations and functions. In addition, the present invention may be practiced in conjunction with any number of optical applications and guidance processes, and the system described is merely one exemplary application for the invention. Further, the present invention may employ any number of conventional techniques for trajectory control, target detection, filtering, optical processing, and the like.

Figure 1:
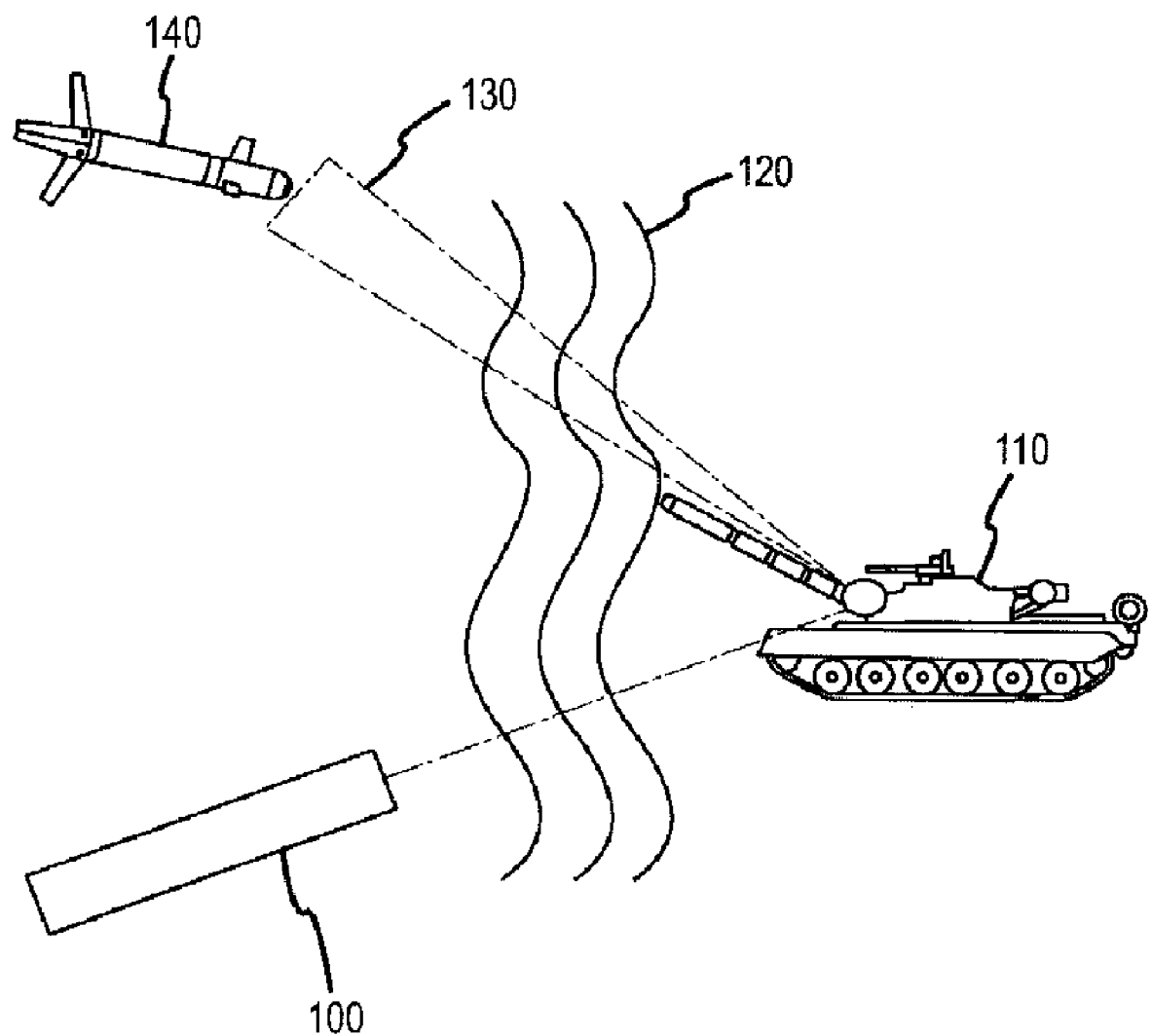
FIG. 1 representatively illustrates the effect of atmospheric scintillation induced aberrations.

Methods and apparatus for tracking an energy source according to various aspects of the present invention may be implemented to identify a direction to the energy source. For example, referring to FIG. 1, a missile system may be configured to operate in conjunction with a semi-active laser homing (SALH) system. An energy source 100, such as a targeting laser, illuminates or "paints" a target 110 to reflect energy 130 from its surface. Alternatively, the energy 130 may be generated by the target 110, such as an infrared signature associated with the target 110. The energy 130 may comprise any appropriate form of energy, such as electromagnetic radiation of any appropriate wavelengths and/or frequencies. A guided projectile 140 is equipped with a guidance system, such as an SAL seeker, which tracks the energy 130 emitted by or reflected from the target 110 and guides the guided projectile 140 towards the perceived energy 130 source on the target 110. Atmospheric turbulence 120 and other factors may cause scintillation.

The projectile 140 may comprise any system to be guided to a target, such as a missile, rocket, a guided munition, smart bomb, or other guided munition. In various embodiments, the projectile 140 comprises a flight control system for controlling the path of the projectile. The flight control system may include, for example, control surfaces, a propulsion system, and/or other systems for governing the path of the projectile 140. The guidance system may also be implemented in non-military applications, for example, in conjunction with private or commercial aircraft or space vehicles. The guidance system may, however, be adapted to any appropriate environment, such as surveying, target location and identification, alignment of astronomical instruments, or other application requiring tracking of an energy source.

Figure 2:
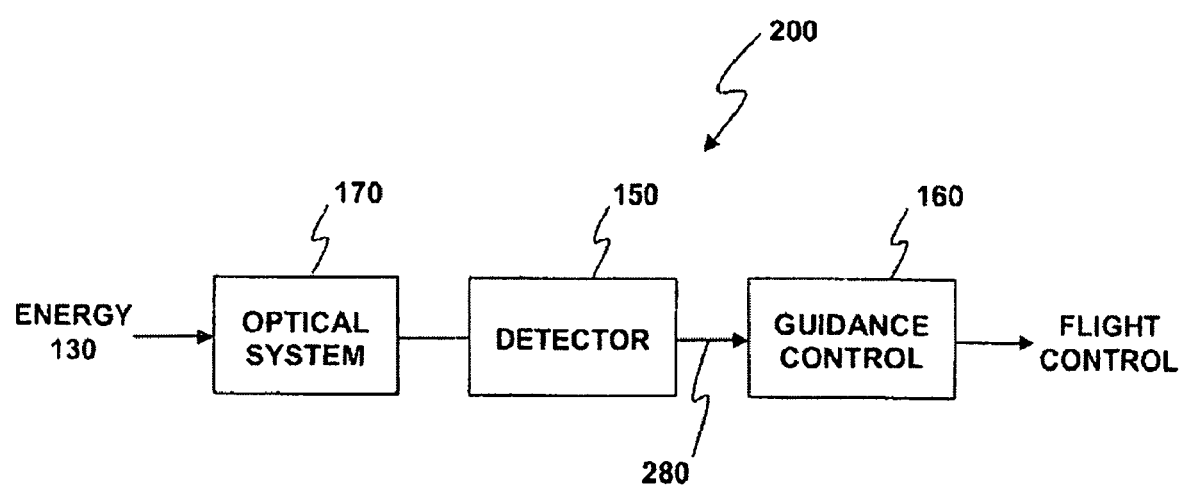
FIG. 2 is a block diagram of a guidance system according to various aspects of the present invention.

Referring to FIG. 2, the guidance system 200 may guide the projectile 140. The guidance system 200 may be configured to facilitate projectile targeting by reducing the effects of scintillation while tracking the energy 130. In one embodiment, the guidance system 200 comprises a non-imaging guidance system including a guidance controller 160, a detector 150, and an optical system 170. The projectile 140 may contain all the components of the guidance system 200, which controls the trajectory of projectile 140. In the present embodiment, the optical system 170 receives energy 130 from the target 110. The detector 150 detects the presence of the energy 130 and generates a signal which is communicated to the guidance controller 160. The guidance controller 160 receives the signal communicated from the detector 150 and provides signals to the flight control system to control the projectile 140 path. The guidance system 200 may include moving components, such as a gimbaled seeker, or may be fixed. In the present embodiment, the guidance system 200 is fixed in position. The guidance system 200 may further comprise any additional elements or components to facilitate implementation, such as a housing, connectors, retaining rings, alignment rings, barrels, pins, adhesives, gaskets, compliant material, spacers, and/or the like.

More particularly, the detector 150 receives energy via the optical system 170 and communicates corresponding signals to the guidance computer system 160. The detector 150 may be configured in any appropriate manner to detect the relevant energy and generate corresponding signals. In particular, the detector 150 may be configured to produce an output signal in response to incident energy. The output signal may vary depending on the position of the incident radiation on the detector 150, and may vary in response to a change in the properties of incident radiation, such as frequency, energy density, wavelength, and total energy. In the present embodiment, the detector 150 is positioned at the exit of the optical system 170 to receive energy from the optical system 170. For example, the detector 150 may be connected to the end of the optical system 170, which may readily align the detector 150 with the optical system 170.

Figure 3:
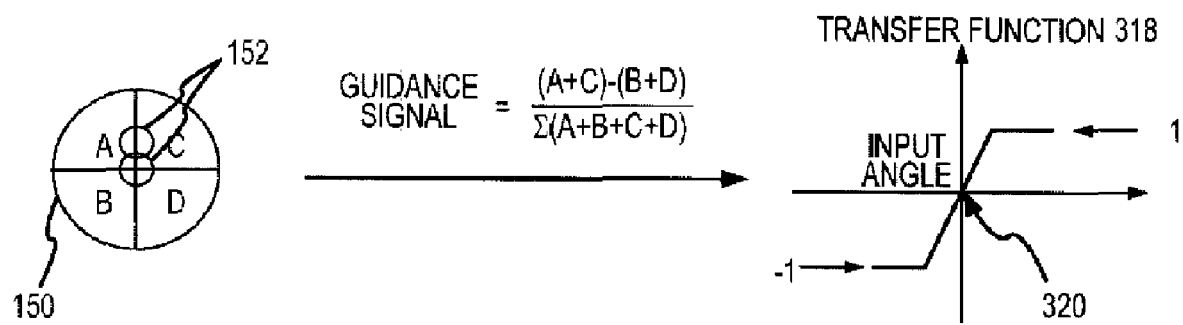
FIG. 3 illustrates a spot on a detector and a transfer function.

Signals generated by the detector 150 may be analyzed to determine the direction from which the energy 130 is received, such as to guide the projectile 140 to the target 110. For example, the detector 150 may generate signals corresponding to the amount of energy striking different parts of the detector 150. In one embodiment, referring to FIG. 3, the detector 150 is divided into two or more energy-sensitive areas around a center point of the detector 150. For example, the present detector 150 is divided into four segments A-D by two perpendicular axes intersecting at the approximate centerpoint of the detector 150. Alternatively, the number and shape of the various segments A-D may be selected according to any criteria and configuration. In one embodiment, the detector 150 comprises a quad-cell detector. Alternatively, the detector 150 may comprise a grouping of separate detection devices, such as four separate detection devices. The detector 150 may comprise any appropriate energy detection system, such as a quad-cell, a digital imaging system comprising an active pixel sensor, single-pixel light detectors, photocells, charge-coupled devices, and the like.

The detector 150 may generate signals according to the amount of energy received in the different segments A-D. Thus, if incoming energy strikes the "southwest" quadrant of the four-area detector 150, the detector may generate a signal corresponding to the southwest quadrant of the detector. In addition, the signal may correspond to the brightness of the energy incident upon the detector. Thus, if both the "southwest" and the "southeast" quadrants receive light in a relevant frequency range, and the relevant light on the southwest quadrant is twice as intense as the light on the southeast quadrant, the detector 150 may generate a first signal corresponding to the light on the southwest quadrant that is twice the magnitude of a second signal corresponding to the southeast quadrant.

The guidance controller 160 receives the signals from the detector 150 and guides the projectile 140 to the energy 130 source. The guidance controller 160 may comprise any controller for receiving information from the detector 150 and guiding the projectile 140 according to the detector information. As the detector 150 communicates information to the guidance controller 160, the controller 160 analyzes the information and, if necessary, transmits guidance information to the control surfaces, propulsion system, or other guidance elements.

The guidance controller 160 analyzes the signals to determine the direction of the target 110 and guides the projectile 140 accordingly. The guidance controller 160 may analyze the detector 150 signals according to the characteristics of the detector 150 and any other relevant factors. For example, the guidance controller 160 may calculate guidance information by analyzing data from each of the detector's segments, such as according to the ratio of energy distribution among the segments on the detector 150. By comparing the amount of energy detected by each of the four detector segments A-D, the guidance computer system 160 may determine the bearing and possibly the range of the source of the energy 130 and direct the projectile 140 accordingly.

In a particular embodiment using a detector 150 having the four detector segments A-D labeled A, B, C and D, the guidance signal can be calculated as follows:

$$GuidanceSignal(vertical) = \frac{(A+C)-(B+D)}{\sum(A+B+C+D)}$$

$$GuidanceSignal(horizontal) = \frac{(A+B)-(C+D)}{\sum(A+B+C+D)}$$

where A-D correspond to the intensity of the light received upon the respective segments. The guidance controller 160 may generate a composite guidance signal corresponding to the amount of flight path adjustment required to track the target 110. If the guidance signal has a value of zero, then the projectile 140 is on target; if not, the guidance controller 160 may adjust the projectile's course to drive the guidance signal to zero. For detectors 150 having alternative detector segment A-D configurations, the guidance controller 160 may use different guidance signal analyses.

The optical system 170 receives energy 130 from the target 110 and transfers the energy 130 to the detector 150. The optical system 170 may comprise any system that may transmit energy 130 from the target 110, such as a reflective or refractive system, to the detector 150 for analysis. For example, the optical system 170 may include one or more lenses, mirrors, filters, concentrators, polarizers, and/or other optical elements to allow the detector 150 to receive the energy 130 from the target.

The optical system 170 receives the relevant energy 130 from the target and directs the energy to the detector 150. For example, the energy source 100 may create an energy spot on the target 110 that is reflected to the optical system 170. The optical system 170 transfers the energy to the detector 150, for example in the form of a defocused spot 152 of energy transmitted onto the surface of the detector 150. The detector 150 may generate the guidance signal 280 according to the position of the spot 152.

More particularly, the detector 150 may effectively measure the centroid of the incident energy on the detector 150.

The transfer function 318 is a ratio of the energy on the different quadrants of the detector 150. When energy 130 is hitting all four quadrants A-D, the guidance system 200 operates in a linear region 320 of the transfer function 318. The transfer function 318 in the linear region 320 determines the angle of the guidance system 200 from the target 110. When energy 130 is hitting only two quadrants, the guidance system 200 operates outside the linear region 320, where the transfer function 318 nears +/−1. The guidance system 200 only knows the direction towards the target 110, but not its true angle.

The size of the spot 152 may affect the performance of the guidance system 200. For example, a small spot 152 tends to move off of overlapping multiple detector areas faster than a big spot. In the present application using a fixed seeker, a larger spot 152 improves the transfer function 318 by making a relatively wide transfer function.

Figure 4:
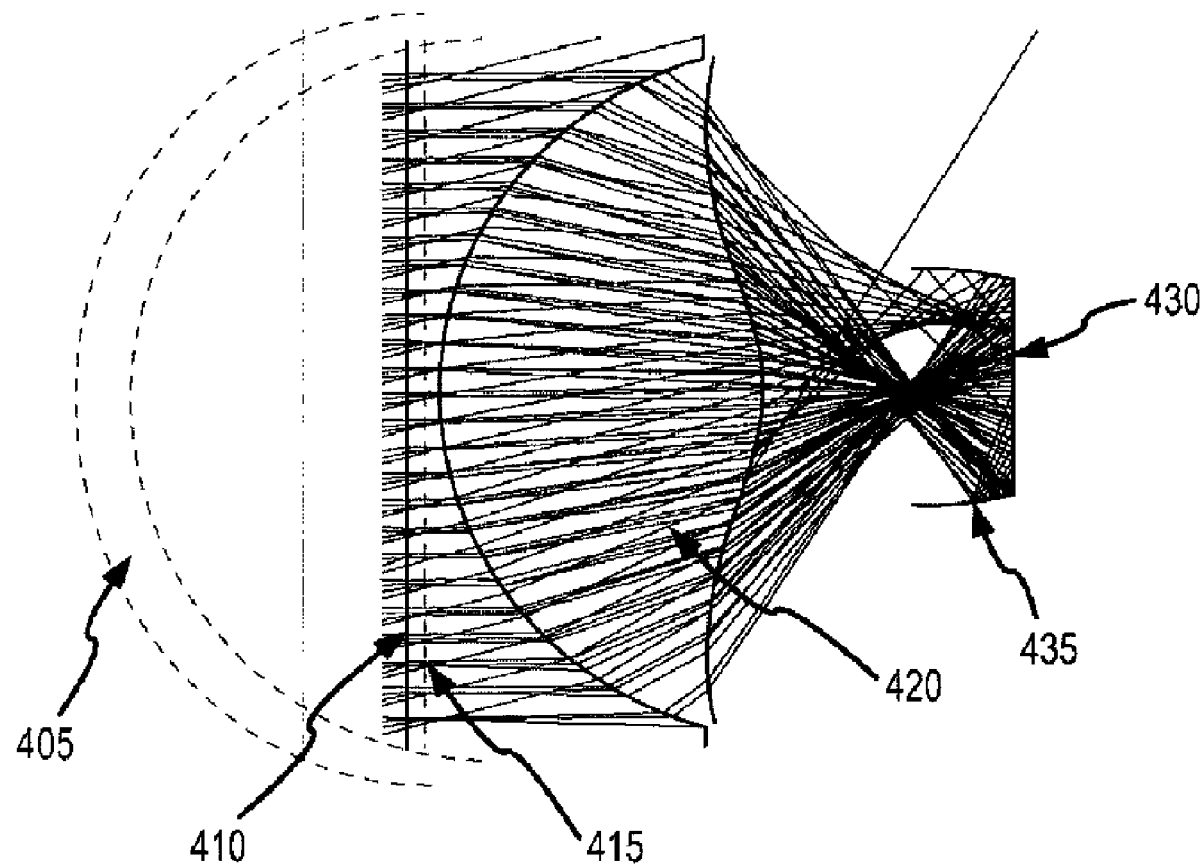
FIG. 4 is a cross-section view and ray diagram of an optical system including a spreader and a condenser.
Figure 5:
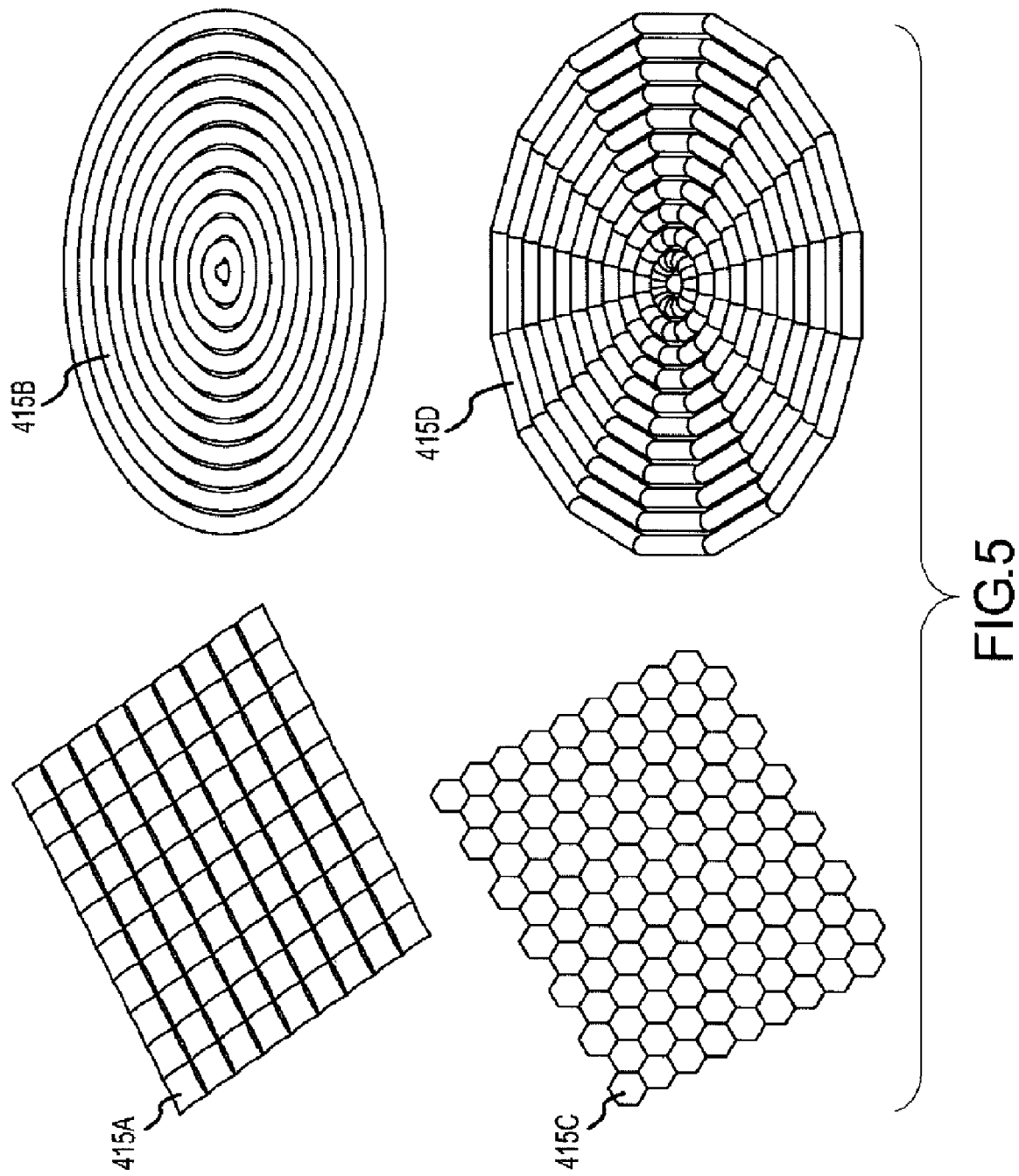
FIG. 5 illustrates various spreader configurations.

Referring to FIG. 4, in the present embodiment, the optical system 170 comprises a condenser 420 and a spreader 415. The spreader 415 subdivides an input aperture of the optical system 170 into subregions. The condenser 420 condenses the energy 130 transmitted by the spreader 415 onto the detector 150. For example, the spreader 415 and condenser 420 may be configured to subdivide the input aperture of the optical system 170 into subregions and superimpose the outputs of the subregions onto the detector 150, such as to make the transfer function of the optical system 170 less sensitive to input irradiance distributions. Subdividing the aperture tends to minimize the effects of fluctuations larger than the size of the subregions on the transfer function 318.

The spreader 415 may comprise any suitable system for spatially homogenizing or otherwise scattering incident energy 130 received by the detector 150. For example, the spreader 415 may comprise a diffuser, a lens array, a diffractive optical element, or other optical spreading element. In various embodiments, the spreader 415 spatially homogenizes the incident energy 130 by transmitting the energy 130 through an input aperture comprising a diffuser or multiple relatively small lenses to scatter the energy 130. The angular spread of the spreader 415 affects the linear region 320 of the transfer function 318. Thus, the spreader 415 may be configured to deliver a selected width of the linear region 320 of the transfer function 318 and desired signal collection angles.

In spreader 415 including a diffuser, the diffuser diffuses incident energy to spatially homogenize the energy 130 received by the detector 150. The diffuser may be selected and/or configured according to any appropriate criteria. For example, the diffuser may comprise a light shaping diffuser from Physical Optics Corporation, which may produce Gaussian spread profiles and high throughput.

In another embodiment, the spreader 415 subdivides the optical system's input aperture into distinct subregions, where each subregion illuminates a relatively large spot centered on the detector 150. The spreader 415 may form the subregions using an array of small lenses or "lenslets". The lenslets scatter incident energy passing through the spreader 415. Each lenslet in the array may produce a fixed angular spread. In addition, the spreader 415 may subdivide the aperture in two directions. For example, one side of the spreader 415 may spread the energy vertically, while the other side spreads the energy horizontally. The transfer function 318 for each sub-region may be substantially identical to the full transfer function 318 of the spreader 415. The spread of each sub-region sets the system transfer function 318, i.e., a ±13 degree cone (~f/2 lenslet) produces a transfer function 318 with a ±13 degree linear region 320.

In the present embodiment, the spreader 415 comprises an array of lenslets comprising a structure having a substantially homogeneous index of refraction and varying thicknesses for form the lenslets. The extent to which the lenslets transmit homogenized energy corresponds to the number and configuration of the lenslets. Alternatively, the spreader 415 may comprise a structure having a heterogeneous index of refraction and a substantially constant thickness, producing the same effect as a plurality of lenslets. Further, the spreader 415 may comprise a material having a substantially heterogeneous index of refraction and varying thicknesses. The varying indices of refraction and the varying thicknesses both provide spatial homogenizing of incident energy.

Various lenslet configurations may be employed to spread incident energy, such as diverging or converging crossed cylinder arrays, pillow lens arrays, and/or other lens arrays. For example, referring to FIGS. 5A-D, the spreader 415 may comprise a rectangular pillow lens array 415A, an array of concentric bands 415B, a hexagonal pillow lens array 415C, concentric bands of joined linear segments 415D, and/or the like. The spreader 415 may be configured to provide distinct patterns of spatial spreading corresponding to distinct structures within a spreader 415. The spreader 415 may be configured for spatially homogenizing incident energy 130 in some regions of the spreader 415 and preserve heterogeneity of incident energy 130 in other regions. Disparate levels of spatial homogenization may be achieved by implementation of disparate materials, implementation of disparate lenslets, implementation of disparate surface features, and/or the like.

In various embodiments, the spreader 415 may comprise an engineered diffuser from Rochester Photonics Corporation comprising a moldable non-periodic lens arrays. The spreader 415 may include very small lenslets compared to the spot size to be projected upon the detector 150. The non-periodic aspect of the array may inhibit diffraction fringes in the transmitted energy.

The condenser 420 redirects incident energy received from the spreader 415 such that the energy converges on a selected portion of the detector 150. In the present embodiment, the condenser 420 may be configured to redirect the energy from the center of each subregion of the spreader 415 to form a small spot on the detector 150. For example, referring again to FIG. 4, the condenser 420 may converge the light from the spreader 415 to form the spot 152 of converged energy 130 on the detector 150. The spot formed by the condenser 420 without the spreader 415 may be substantially smaller than the spot 152 formed by the combination of the spreader 415 and the condenser 420, which tends to ensure that the spots formed by the subregions of the spreader 415 overlap each other. The optical system 170 may thus be less sensitive to input irradiance distributions because the effects of fluctuations larger than the size of the subregions on the spreader 415 do not substantially change the size and shape of the spot 152 and hence the transfer function 318 remains substantially the same.

Figure 6:
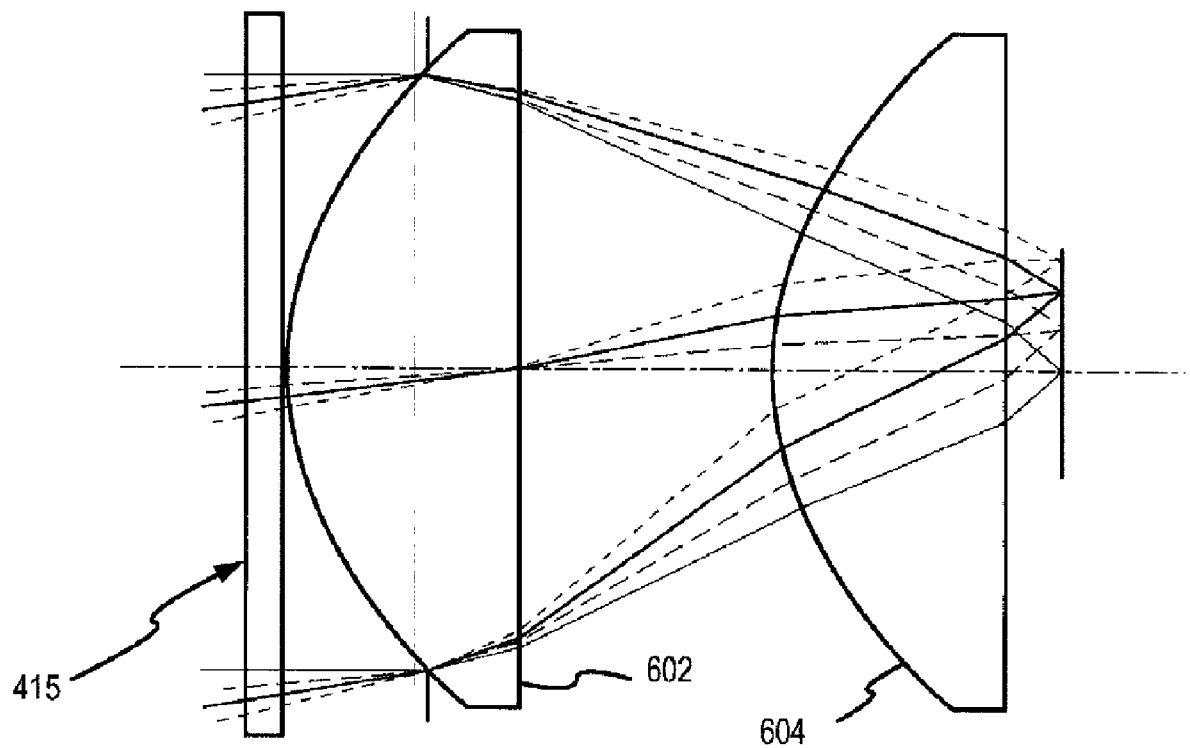
FIG. 6 is a cross-section view of an optical system with a dual lens condenser.
Figure 7:
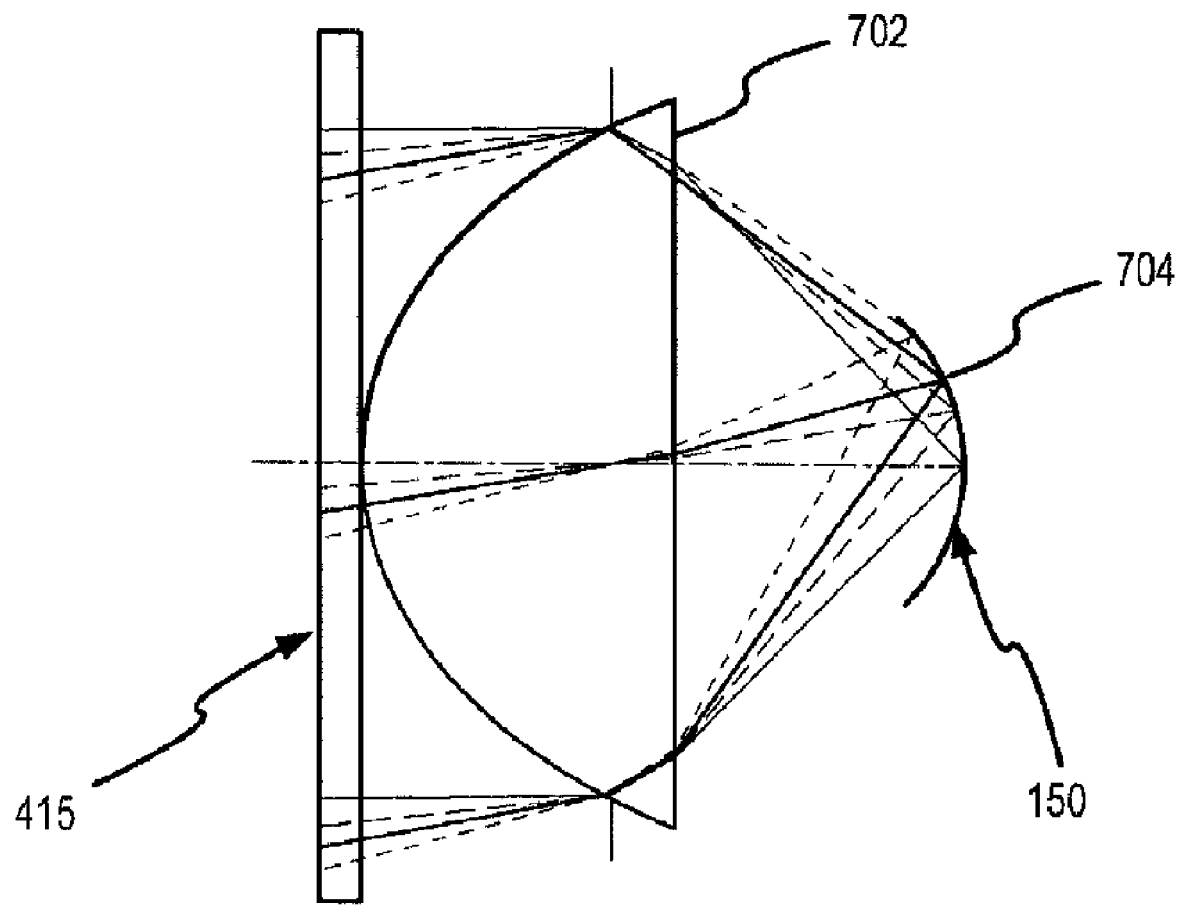
FIG. 7 is a cross-section view of an optical system with a single lens condenser.

The condenser 420 may comprise any appropriate system for redirecting the energy, such as one or more lenses, mirrors, splitters, prisms, and/or the like. For example, referring to FIG. 6, the condenser 420 may comprise two or more sharp focus lenses 602, 604 to converge energy towards the center of the detector 150. Alternatively, referring to FIG. 7, the condenser 420 may comprise a single lens 702. Using a single lens 702 reduces cost and provides higher energy 130 transmission to the detector 150. A single lens 702 system may further include a curved image plane 704 for the detector 150 to more effectively map the subregions of the spreader 415 onto the detector 150, which may decreases aberrations and provide for enhanced scintillation control. Scintillation control may be adjusted by modifying the ratio between the spot size produced by the combined spreader 415 and condenser 420 and the spot size produced by the condenser 420 alone.

Figure 8:
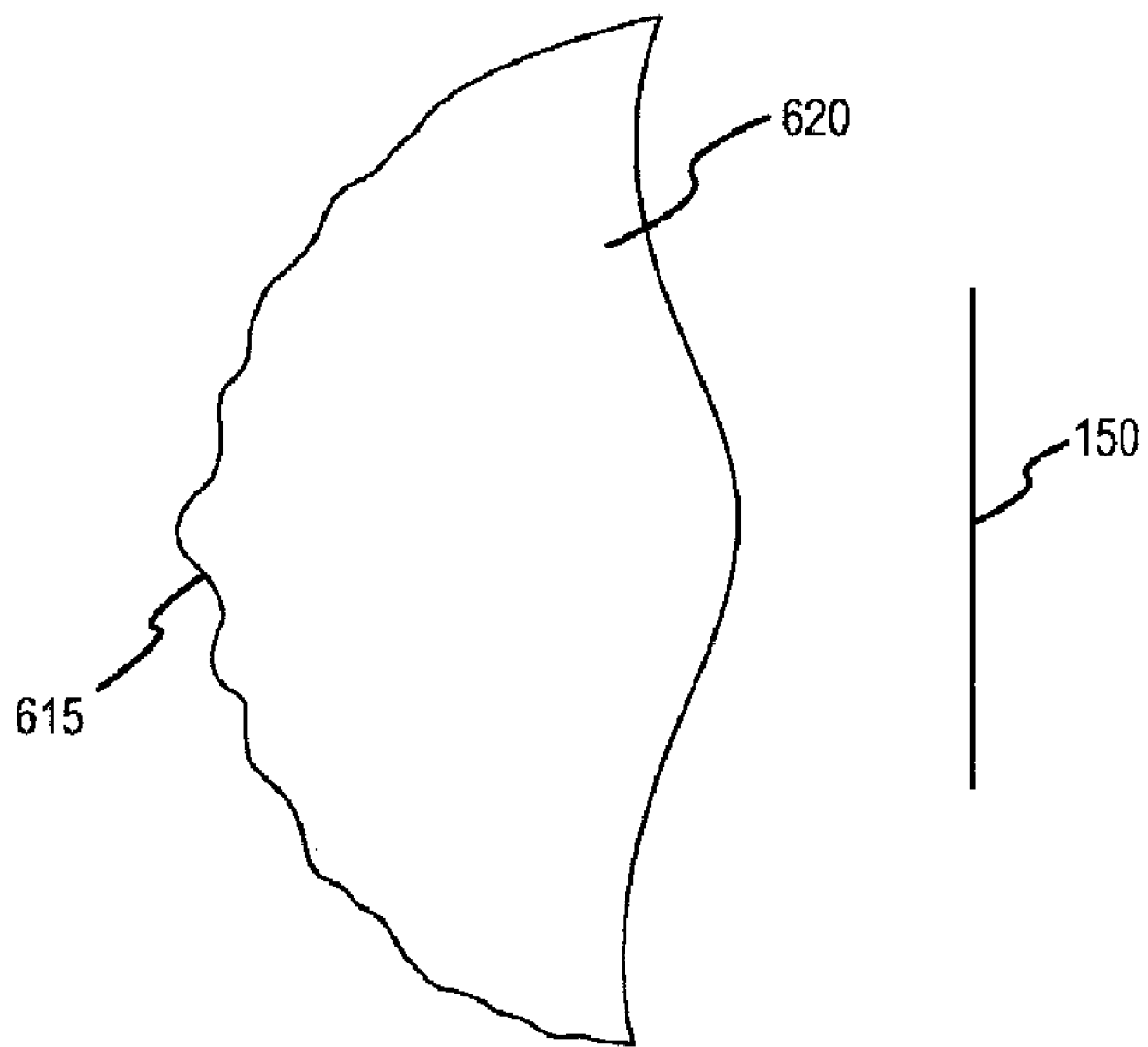
FIG. 8 is a cross-section view of an optical system with an integrated spreader/condenser element.

The spreader 415 and condenser 420 may be implemented as separate elements and/or may be integrated into a single unit, for example to reduce the number of parts and/or the package size of the guidance system 200. For example, referring to FIG. 8, a spreader 615 configured for spatially homogenizing incident energy 130 may be integrated into a surface of a condenser 620. The spreader 615/condenser 620 unit may require an adjusted thickness to provide adequate distance over which to diffuse transmitted energy. The spreader 615 may be integrated into any portion of the condenser 620, such as the front surface, rear surface, or interior of the condenser 620.

Figure 9:
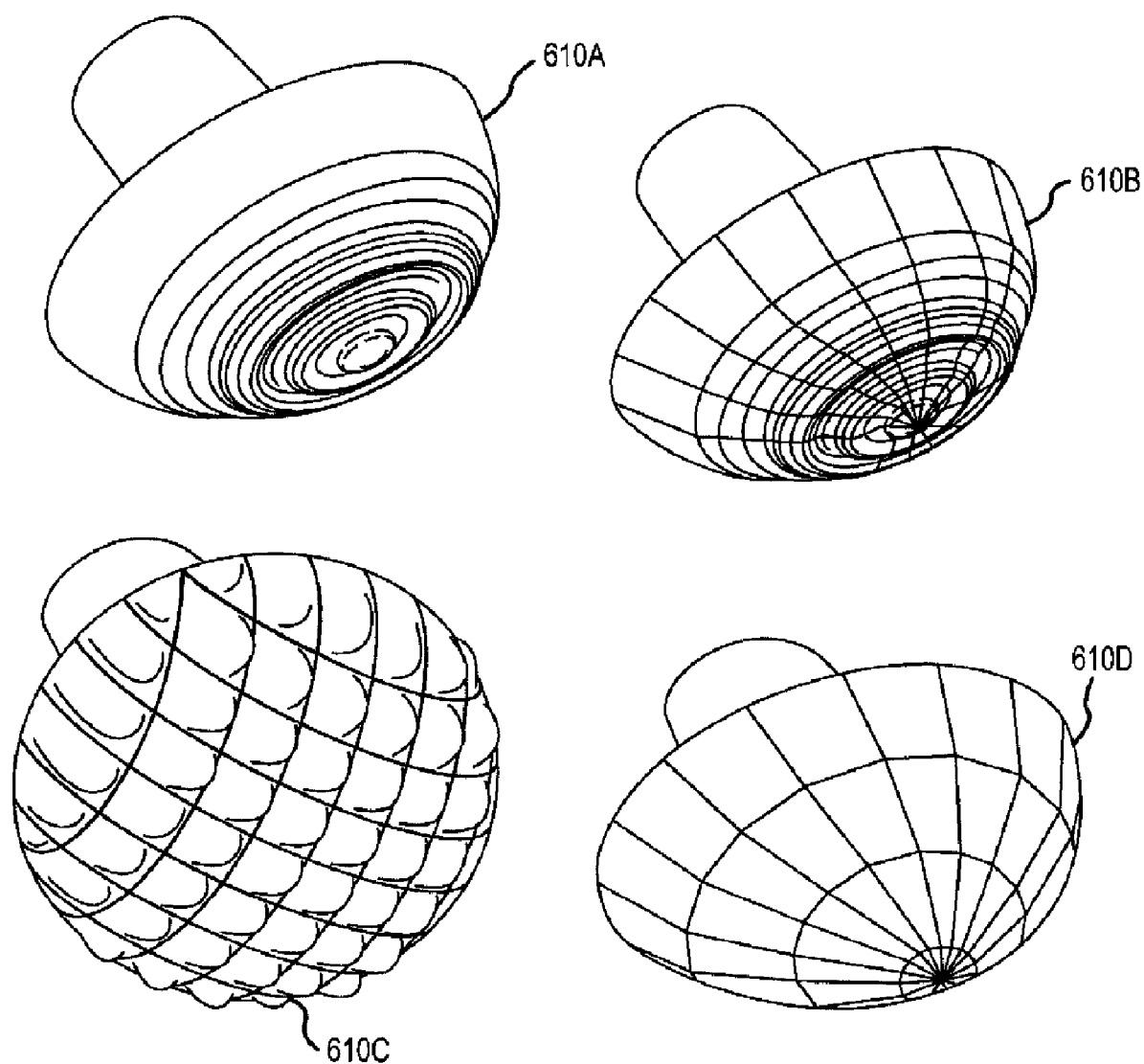
FIG. 9 illustrates various spreader configurations on an integrated spreader/condenser element.

The spreader 615 may be formed to feature surface topology according to any appropriate criteria and/or configurations. For example, referring to FIG. 9, the spreader 615 configuration may correspond to planar embodiments, such as including radial undulations around a point substantially centered on the spreader 615A, radial undulations with respect to a point substantially centered on the spreader 615 and incorporating azimuthal planarity 615B, a substantially parabolic topology with respect to a point substantially centered on the spreader 615 incorporating azimuthal planarity 610D, rectangular undulations arranged in a gridlike fashion on the surface of a substantially parabolic topology 610C, and/or the like. The surface topology may conform to any appropriate geometry, such as a sinusoidal deviation, a rational Bezier curve, or other geometry. The spreader 615 may also incorporate various features to effect the desired optical properties, such as including lenslets, embedded particles, treated portions, and/or the like. Further, the transfer function may be controlled by controlling the shape and configuration of the topology.

Any appropriate technique may be employed to fabricate optical systems in accordance with various exemplary embodiments of the present invention. For example, the spreader 615 structures may be molded or milled (e.g., diamond turning), defined via etching and/or blasting, or formed using stamp and flash imprint lithography (SFIL). In the present embodiment, SFIL uses photopolymerization of an organosilicon solution through a rigid transparent imprint template to define a pattern topography on a substrate. The use of a low-viscosity UV curing solution allows imprinting at room temperature with minimal applied pressure. The imprinting process may be performed over a blanket layer of organic polymer, creating a bilayer structure, which removes the need to imprint high aspect ratio features, as the pattern aspect ratio can be subsequently amplified by dry etching. The use of a rigid transparent imprint template facilitates flood exposure of the photopolymer to achieve cure and enables classical optical techniques commonly used in mask aligners, photolithography steppers, and scanners for layer-to-layer alignment. The SFIL process may include the following steps:

An organic polymer transfer layer is spin-coated on a substrate, typically silicon;

A low viscosity, photopolymerizable, organosilicon solution (etch barrier) is then dispensed on the substrate in the area to be imprinted;

A transparent template bearing patterned relief structures is aligned over the coated substrate;

The template is lowered onto the substrate, displacing the etch barrier that fills the imprint field and trapping the etch barrier solution in the template relief. Irradiation with UV light through the backside of the template cures the etch barrier into a crosslinked polymer film. A fluorocarbon release layer on the template allows separation from the substrate, leaving an organosilicon relief image that is a replica of the template pattern;

A halogen etch is then used to break through the undisplaced etch barrier material (residual layer) exposing the underlying transfer layer; and An oxygen reactive ion etch (RIE) is used to transfer the image through the transfer layer thereby amplifying the aspect ratio of the imprinted image. In various representative embodiments, the organosilicon material may be matched to the index of refraction of the substrate in order to avoid undesirable optical performance of the resulting device.

Referring again to FIG. 4, the optical system 170 may further comprise a concentrator 435 to concentrate the energy 130 received by the optical system 170. The concentrator 435 may perform any appropriate function, such as to expand the effective field of view of the detector 150, concentrate light at a relatively large input aperture onto a smaller area of the detector 150, stray light rejection, athermalization, and angular jitter control. The concentrator 435 may be configured in any appropriate manner, and is described in detail in copending U.S. patent application Ser. No. 11/548,968 filed 12 Oct. 2006, which is incorporated by reference. In the present embodiment, the concentrator 435 is a nonimaging concentrator such that rays transmitted by the concentrator 435 are not concentrated to a single point. For example, the concentrator 435 may comprise a compound parabolic concentrator, which may increase concentration and increase the apparent size of the detector 150.

The concentrator 435 may be further configured with internal reflectors, for example to maintain channel separation. Thus, energy 130 entering the concentrator 435 in the quadrant corresponding to section C of the detector 150 is confined to section C and, if transmitted by the optical system 170, strikes segment C of the detector 150. The internal reflectors may be configured to maintain the collection and rejection properties of the concentrator 435 while inhibiting crossover into other quadrants. In addition, the rear edge of the internal reflectors may be curved to accommodate and mate with a curved detector 150 surface, if appropriate. The curved image plane may improve the performance of the condenser 420 and improve scintillation control.

The optical system 170 may further include any other appropriate elements and components. For example, the optical system 170 and/or the detector 150 may include optical coatings, such as filter coatings and anti-reflection (AR) coatings. In one embodiment, the spreader 415 includes an AR coating, which may improve the energy collected by the optical system 170 and permit use of a reduced entrance diameter and lower package length.

Further, referring again to FIG. 4, the optical system 170 may include an optical filter 410, such as a bandpass filter, to reduce or eliminate unwanted wavelengths of the electromagnetic spectrum. For example, where an energy source 100 generates energy within a particular wavelength range, an optical filter 410 may impede transmission of all other wavelengths. In embodiments where the spreader 415 and the condenser 420 are configured for operation with polarized electromagnetic radiation, an optical filter 410 may be configured to polarize incident electromagnetic radiation. In embodiments where solar radiation could impair operation, the optical filter 410 may be configured to impede transmission of solar radiation through the optical system 170.

The guidance system 200 may further comprise a protective cover 405 to protect the optical system 170 from environmental contamination and damage. The protective cover 405 may comprise a translucent or transparent cover having any appropriate properties, such as an aerodynamic shape or selected optical properties. For example, the protective cover 405 may be configured to transmit energy substantially unmodified, to converge the energy, and/or to diverge the energy.

Figure 10:
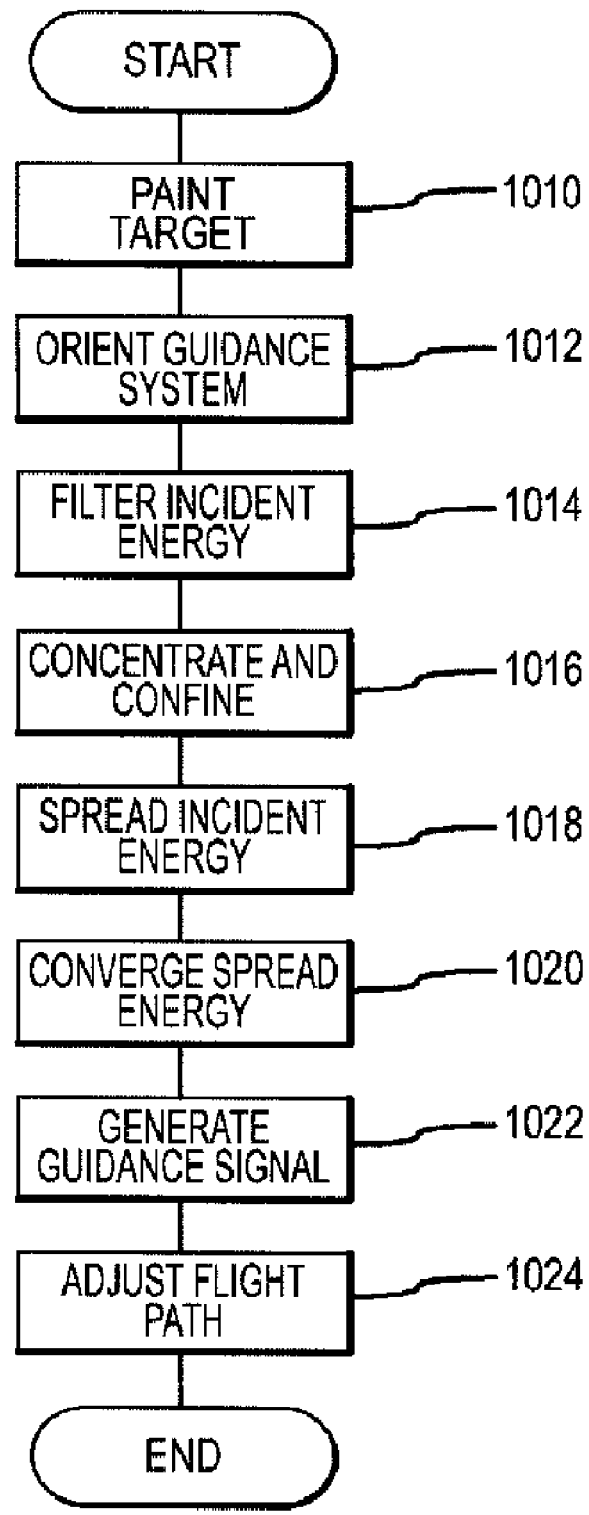
FIG. 10 is a flow diagram of a guidance process.

Referring to FIG. 10, in operation, the energy source 100 "paints" the target 110 with energy 130 (1010), which is reflected from the target. The guidance system 200 is pointed towards the target 110 (1012), and the energy 130 reflected from the target 110 passes through the protective cover 405. The filter 410 may filter unwanted frequencies, polarities, and the like from the incoming energy 130 (1014), and the energy 130 may enter the concentrator 435. Upon entering the concentrator 435, the energy 130 may be confined by internal reflectors to a particular section of the concentrator 435 (1016).

The energy 130 that is transmitted by the concentrator 435 is transmitted to the spreader 415, which spreads the energy (1018). The spreader 415 tends to reduce the effects of large scintillations as the energy passes through the subregions of the spreader 415. The energy 130 is received by the condenser 420, which converges the energy 130 onto the detector 150 (1020). The detector 150 generates a signal corresponding to the energy 130 received. If the guidance system is pointed directly at the target 110, the signal is zero. If not, the detector 150 generates a nonzero signal, which is provided to the guidance controller 160 (1022). The guidance controller 160 adjusts the flight control systems according to the signals (1024).

The particular implementations shown and described are illustrative of the invention and its best mode and are not intended to otherwise limit the scope of the present invention in any way. Indeed, for the sake of brevity, conventional manufacturing, connection, preparation, and other functional aspects of the system may not be described in detail. Furthermore, the connecting lines shown in the various figures are intended to represent exemplary functional relationships and/or physical couplings between the various elements. Many alternative or additional functional relationships or physical connections may be present in a practical system.

In the foregoing description, the invention has been described with reference to specific exemplary embodiments; however, various modifications and changes may be made without departing from the scope of the present invention. The description and figures are to be regarded in an illustrative manner, rather than a restrictive one and all such modifications are intended to be included within the scope of the present invention. Accordingly, the scope of the invention should be determined by the generic embodiments described and their legal equivalents rather than by merely the specific examples described above. For example, the steps recited in any method or process embodiment may be executed in any order and are not limited to the explicit order presented in the specific examples. Additionally, the components and/or elements recited in any apparatus embodiment may be assembled or otherwise operationally configured in a variety of permutations to produce substantially the same result as the present invention and are accordingly not limited to the specific configuration recited in the specific examples.

Benefits, other advantages and solutions to problems have been described above with regard to particular embodiments; however, any benefit, advantage, solution to problems or any element that may cause any particular benefit, advantage or solution to occur or to become more pronounced are not to be construed as critical, required or essential features or components.

As used herein, the terms "comprises", "comprising", or any variation thereof, are intended to reference a non-exclusive inclusion, such that a process, method, article, composition or apparatus that comprises a list of elements does not include only those elements recited, but may also include other elements not expressly listed or inherent to such process, method, article, composition or apparatus. Other combinations and/or modifications of the above-described structures, arrangements, applications, proportions, elements, materials or components used in the practice of the present invention, in addition to those not specifically recited, may be varied or otherwise particularly adapted to specific environments, manufacturing specifications, design parameters or other operating requirements without departing from the general principles of the same.

The present invention has been described above with reference to an exemplary embodiment. However, changes and modifications may be made without departing from the scope of the present invention. These and other changes or modifications are intended to be included within the scope of the present invention, as expressed in the following claims.

The invention claimed is:

1. A guidance system, comprising:
   a spreader comprising multiple subregions, wherein each subregion is configured to spatially homogenize incident electromagnetic radiation energy having at least one wavelength in the range of 0.20 microns to 30 microns;
   a condenser coupled to the spreader; and
   a detector coupled to the condenser and configured to generate a guidance signal in response to the incident electromagnetic radiation energy,
   wherein the condenser is configured to converge the spatially homogenized incident electromagnetic radiation energy onto the detector.

2. A guidance system according to claim 1, wherein the spreader comprises a plurality of lenslets.

3. A guidance system according to claim 1, wherein the spreader comprises a diffuser.

4. A guidance system according to claim 1, further comprising a concentrator coupled to the spreader.

5. A guidance system according to claim 4, wherein the concentrator comprises a compound parabolic concentrator.

6. A guidance system according to claim 4, wherein the concentrator comprises an internal reflector defining multiple sections within an interior of the concentrator.

7. A guidance system according to claim 1, wherein the spreader is integrated into the condenser.

8. A guidance system according to claim 1, wherein the condenser is configured to converge the spatially homogenized incident electromagnetic radiation energy onto a curved surface of the detector.

9. A guidance system according to claim 1, wherein the spreader comprises a nonperiodic lens array.

10. The guidance system according to claim 1, wherein the electromagnetic radiation comprises at least one of visible light and infrared radiation.

11. A method for guiding a projectile, comprising:
    receiving electromagnetic radiation energy having at least one wavelength in the range of 0.20 microns to 30 microns from a target;
    transmitting the electromagnetic radiation energy through a spreader;

condensing the electromagnetic radiation energy from the spreader onto a detector;

generating a guidance signal according to the electromagnetic radiation energy on the detector; and guiding the projectile according to the guidance signal.

12. The method of claim 11, wherein the spreader comprises a plurality of lenslets.

13. The method of claim 11, wherein the spreader comprises a diffuser.

14. The method of claim 11, further comprising transmitting the electromagnetic radiation energy through a concentrator.

15. The method of claim 14, wherein the concentrator comprises a compound parabolic concentrator.

16. The method of claim 14, wherein the concentrator comprises an internal reflector defining multiple sections within an interior of the concentrator.

17. The method of claim 11, wherein the spreader is integrated into the condenser.

18. The method of claim 11, wherein condensing the electromagnetic radiation energy comprises converging the electromagnetic radiation energy from the spreader onto a curved surface of the detector.

19. The method of claim 11, wherein the spreader comprises a nonperiodic lens array.

20. The method of claim 11, wherein the electromagnetic radiation comprises at least one of visible light and infrared radiation.

21. A projectile, comprising:
a flight control system; and
a guidance system coupled to the flight control system, comprising:
a spreader comprising multiple subregions, wherein each subregion is configured to spatially homogenize incident electromagnetic radiation energy having at least one wavelength in the range of 0.20 microns to 30 microns;
a condenser coupled to the spreader; and
a detector coupled to the condenser and configured to generate a guidance signal in response to the incident electromagnetic radiation energy,
wherein the condenser is configured to converge the spatially homogenized incident electromagnetic radiation energy onto the detector.

22. A projectile according to claim 21, wherein the spreader comprises a plurality of lenslets.

23. A projectile according to claim 21, wherein the spreader comprises a diffuser.

24. A projectile according to claim 21, wherein the guidance system further comprises a concentrator coupled to the spreader.

25. A projectile according to claim 24, wherein the concentrator comprises a compound parabolic concentrator.

26. A projectile according to claim 24, wherein the concentrator comprises an internal reflector defining multiple sections within an interior of the concentrator.

27. A projectile according to claim 21, wherein the spreader is integrated into the condenser.

28. A projectile according to claim 21, wherein the condenser is configured to converge the spatially homogenized incident electromagnetic radiation energy onto a curved surface of the detector.

29. A projectile according to claim 21, wherein the spreader comprises a nonperiodic lens array.

30. The projectile according to claim 21, wherein the electromagnetic radiation comprises at least one of visible light and infrared radiation.

* * * * *